United States Patent
Hurlburt

(10) Patent No.: US 8,365,498 B2
(45) Date of Patent: Feb. 5, 2013

(54) THERMAL BARRIER CONSTRUCTION MATERIAL

(76) Inventor: Thomas Lucian Hurlburt, Garland, TX (US)

(*) Notice: Subject to any disclaimer, the term of this patent is extended or adjusted under 35 U.S.C. 154(b) by 0 days.

(21) Appl. No.: 12/943,458

(22) Filed: Nov. 10, 2010

(65) Prior Publication Data

US 2011/0107723 A1    May 12, 2011

Related U.S. Application Data

(60) Provisional application No. 61/260,216, filed on Nov. 11, 2009.

(51) Int. Cl.
*E04B 1/00*    (2006.01)
(52) U.S. Cl. .............. 52/745.09; 52/742.13; 52/408; 428/703
(58) Field of Classification Search .............. 52/404.1, 52/407.1, 407.3, 408, 481.1, 742.13, 745.09, 52/309, 309.4, 309.9, 794.1; 428/703, 166, 428/178
See application file for complete search history.

(56) References Cited

U.S. PATENT DOCUMENTS

| | | | |
|---|---|---|---|
| 2,033,752 A | 3/1936 | Billingham | |
| 2,582,144 A * | 1/1952 | Miles | 52/404.1 |
| 2,754,235 A | 7/1956 | Wesner | |
| 3,159,882 A * | 12/1964 | Slayter | 52/411 |
| 3,336,709 A | 8/1967 | Berney et al. | |
| 3,654,067 A | 4/1972 | Klein | |
| 3,908,062 A | 9/1975 | Roberts | |
| 4,033,084 A | 7/1977 | Shiflet | |
| 4,059,936 A * | 11/1977 | Lukens | 52/764 |
| 4,077,168 A | 3/1978 | Smith | |
| 4,478,018 A * | 10/1984 | Holand | 52/220.1 |
| 4,882,888 A * | 11/1989 | Moore | 52/309.9 |
| 5,397,631 A | 3/1995 | Green et al. | |
| 5,565,252 A | 10/1996 | Finestone et al. | |
| 5,822,940 A * | 10/1998 | Carlin et al. | 52/479 |
| 6,279,284 B1 * | 8/2001 | Moras | 52/408 |
| 6,557,313 B1 * | 5/2003 | Alderman | 52/407.3 |
| 6,854,228 B2 | 2/2005 | Arseneau et al. | |
| 6,901,713 B2 | 6/2005 | Axsom | |
| 7,574,837 B2 * | 8/2009 | Hagen et al. | 52/404.1 |
| 7,818,922 B2 * | 10/2010 | Ellis | 52/95 |
| 8,011,151 B2 * | 9/2011 | Pollack | 52/309.8 |

* cited by examiner

*Primary Examiner* — William Gilbert
*Assistant Examiner* — Gisele Ford
(74) *Attorney, Agent, or Firm* — St. Onge Steward Johnston & Reens LLC

(57) ABSTRACT

A thermal board including a first layer, a reflective layer a spacing device and a second layer bonded together as a single unitary structure. The spacing device forms a cavity between the first and second layers in which insulation may be positioned. It is contemplated that in one embodiment the first layer is provided as gypsum board and the second layer is a paper material. In another embodiment, a third layer is positioned between the first and second layers, where the third layer is a dense fiber board. Reflective layer(s) is/are provided as thermally reflective layers are provided as, for example, a spray coating and/or a metallic foil acting like a mirror to Infrared Radiation. The thermal board may be provided as a 4'×8' sheet of material as a single bonded, unitary structure that may be cut and installed in the same manner as standard drywall.

19 Claims, 4 Drawing Sheets

THERMAL BARRIER CONSTRUCTION MATERIAL

CROSS-REFERENCE TO RELATED APPLICATIONS

This patent application claims the benefit, under 35 U.S.C. §119(e), of U.S. Provisional Patent Application Ser. No. 61/260,216 filed Nov. 11, 2009, the content of which is incorporated herein by reference.

FIELD OF THE INVENTION

The invention relates to the field of insulating construction materials, and more specifically, to a system and method for providing a compact and easy to install thermally insulated wall board.

BACKGROUND OF THE INVENTION

The use of wall board, which may include, for example, sheetrock or drywall, has been in use for many years. Drywall is used as a finish material for interior spaces, e.g., walls and ceilings, whether in a residential, commercial or industrial environment. Typically, the installer will affix the drywall to the interior surface of the support structure, which may include, for example, wall studs, ceiling joints, etc., which can then be finished with various wall coverings.

However, drywall is primarily provided as an interior wall finish and provides little, if any, barrier to thermal losses. To minimize thermal losses from the interior space to the outside (whether loss of cooling in the summer or loss of heat in the winter), typically an insulating product is installed in the interior of the wall space. The insulation, for example, a fiberglass product or thermal foam product, has a thermal curve so as to minimize the migration of thermal energy across the insulating material.

Typically, the thicker the insulation, the larger the thermal curve, which in turn, provides a better thermal barrier. With the rising cost of energy, the finite sources of non-renewable energy, economic downturns and a desire to minimize the carbon impact on the environment, the need to lower energy consumption has become a major consideration for consumers.

With commercial and residential construction, typically the install will position insulation so as to minimize thermal losses from the building. This would entail, for example, locating insulating material in exterior walls and ceilings. Once the insulating material is installed, the interior surface of the support structure is then covered by the drywall. While this does provide a thermal barrier between the interior of the building and the exterior, there is still thermal migration is occurring inside the wall (e.g. where the insulating material is positioned). While standard fiberglass insulation does provide a fairly good thermal curve, especially when the thickness of the insulating material is increased, thermal losses from the space do escape into the wall (e.g. past the drywall into the insulation). This thermal loss through the drywall escapes upward inside the wall (e.g., between the drywall and the insulation).

There are a number of products that have been used that can lower thermal migration inside the wall cavity (such as, foam insulation that substantially takes up all the space in the wall cavity). However, known methods require special equipment and training, are difficult to install, are expensive to install and, once installed, make it virtually impossible to use the wall cavity space as a chase for wiring installed at a later time (e.g., it is virtually impossible to run electrical/data/telephone wiring in a wall filled with foam insulation).

Accordingly, what is desired is a system and method that provides improved thermal insulating properties from an interior space to an exterior space over standard insulating materials.

It is also desired to provide a system and method that minimizes or substantially prevents thermal migration within a wall cavity.

It is further desired to provide a system and method that minimizes or substantially prevents thermal migration within a wall cavity while at the same time, does not interfere with or prevent an installer from using the wall cavity as a chase for equipment (e.g., wiring) retrofit after the installation of the insulating material.

It is still further desired to provide a system and method that provides improved thermal insulating properties that is easy to install, does not require the use of specialized equipment and does not require specialized training to install.

SUMMARY OF THE INVENTION

These and other objects are achieved in one advantageous embodiment of the invention by the provision of a thermal board that may be affixed to the inner surface of a structure (i.e., in the same manner as conventional drywall). However, rather than simply providing an interior wall finish, the thermal board provides a barrier to thermal migration across the thermal board itself. This advantageously prevents thermal losses by substantially eliminating heating or cooling losses inside the wall cavity due to thermal migration to and from the top of the wall.

The thermal board may, in one advantageous embodiment, be provided as a composite board. For example, it is contemplated that the thermal board may be provided with an interior surface that substantially comprises a sheet of ¼ inch drywall that would face inward toward the interior space. This will present a look and feel for the thermal board that is identical to standard drywall. While ¼ inch is listed as an example, it is contemplated that virtually any thickness may be used. For example, typically ½" drywall is used in residential settings, while ⅝" drywall is used in commercial environments.

A second layer may comprise a dense-fiber board having very high thermal properties (e.g., a high thermal curve). For example, it is contemplated that DensGlass™ as manufactured by Georgia-Pacific may effectively be used for the second layer.

The second layer may further be provided with a thermally reflective layer affixed or applied to each side of the dense fiber board. This thermally reflective layer may, in one advantageous embodiment, comprise a thermal spray having an emissivity value of less than 0.25 (e.g., e–0.25). The thermal spray may comprise a ceramic-aluminum composite comprising a barrier coat where the aluminum is provided in the spray in the form of thin aluminum flakes that are highly reflective and reduce the penetration of Infrared Radiation (IR).

In another advantageous embodiment, a thin sheet of thermally reflective layer may be used in place of the spray coating. The thermally reflective layer may be very thin relative to the dry wall layer and the dense-fiber board layer such that its thickness in measuring the overall thickness of the bonded structure may be ignored. Like the spray coating, the thin sheet may, in one advantageous embodiment, be bonded to each side of the second layer.

Once the reflective layer is applied, for example, to each side of the second layer, the first and second layers may then be bonded together to form one unitary structure (i.e. the thermal board). The final thickness of the thermal board will essentially be determined by the thickness of the first and second layers. It is contemplated that the bonding material may comprise virtually any type of commercially available adhesive for permanently bonding the first and second layers together into a solid, unitary structure.

In still another advantageous embodiment, a corrugation or spacing device may be positioned between the first and second layers to form a space into which a thermal foam or insulation (having good thermal characteristics) may be injected or inserted. It is contemplated that the injected insulation may be provided as liquid that will set up or harden so as to create a single composite thermal board.

The thermal board, once assembled, may be installed in the same manner as conventional drywall. For example, it is contemplated that the thermal board may be provided in a standard 4' by 8' sheet, such that an installer may cut the thermal board as required for the particular installation. Once installed, however, the thermal board will act as a thermal barrier at the surface of the interior wall, rather than allowing for thermal migration inside the wall cavity. For example, the second layer of dense-fiber board will provide a thermal barrier, while the reflective layers applied to either side of the second layer will act to further reflect radiation. It is contemplated that the thermal board may be installed either with or without conventional fiberglass insulation being installed in the exterior wall. If, however, conventional fiberglass is used, it is understood that the thickness of the fiberglass can be greatly reduced due to the thermal properties of the thermal board thereby reducing the cost associated with purchasing the insulating material and providing for easier installation. This, in turn, provides a wall cavity that is easier to retrofit equipment in (e.g., wires).

In still another advantageous embodiment, the first layer may be provided as a drywall material and the second layer may be provided as a heavy paper with the corrugation or spacing device positioned therebetween to form a cavity. A thermal foam or insulation as described above, may be injected or inserted into the cavity. In still another embodiment, the side of the drywall facing toward the corrugation or spacing device may be provided with the thin sheet of thermally reflective layer or spray as described above. Still further, the first layer of drywall material may be provided with the second layer dense fiber board positioned between the first layer of drywall and the corrugation or spacing device.

The terms "first" and "second" are used to distinguish one element, object or thing from another, and are not used to designate relative position or arrangement in time.

The terms "coupled", "coupled to", "coupled with", "connected", "connected to", and "connected with" as used herein each mean a relationship between or among two or more devices, apparatus, components, systems, subsystems, and/or means, constituting any one or more of (a) a connection, whether direct or through one or more other devices, apparatus, components, systems, subsystems, or means, and/or (b) a functional relationship in which the operation of any one or more devices, apparatus, components, systems, subsystems, or means depends, in whole or in part, on the operation of any one or more others thereof.

In one advantageous embodiment a composite thermal barrier structure is provided comprising a first layer comprising gypsum board positioned toward an interior space in a structure and a second layer positioned toward an exterior of the structure relative to the first layer. The composite thermal barrier structure also comprises a first thermally reflective layer positioned between the first and second layers and a second thermally reflective layer positioned on a surface of the second layer opposite the first thermally reflective layer. The composite thermal barrier structure is provided such that the first and second layers and the first and second thermally reflective layers are bonded together as a single unitary structure.

In another advantageous embodiment a method for providing a composite thermal barrier structure is provided comprising the steps of providing a first layer comprising gypsum board positioned toward an interior space in a structure, providing a second layer positioned toward an exterior of the structure relative to the first layer and positioning a first thermally reflective layer between the first and second layers. The method further comprises the steps of positioning a second thermally reflective layer on a surface of the second layer opposite the first thermally reflective layer and bonding the first and second layers and the first and second thermally reflective layers together as a single unitary structure.

Other objects of the invention and its particular features and advantages will become more apparent from consideration of the following drawings and accompanying detailed description.

DETAILED DESCRIPTION OF THE INVENTION

Figure 1:
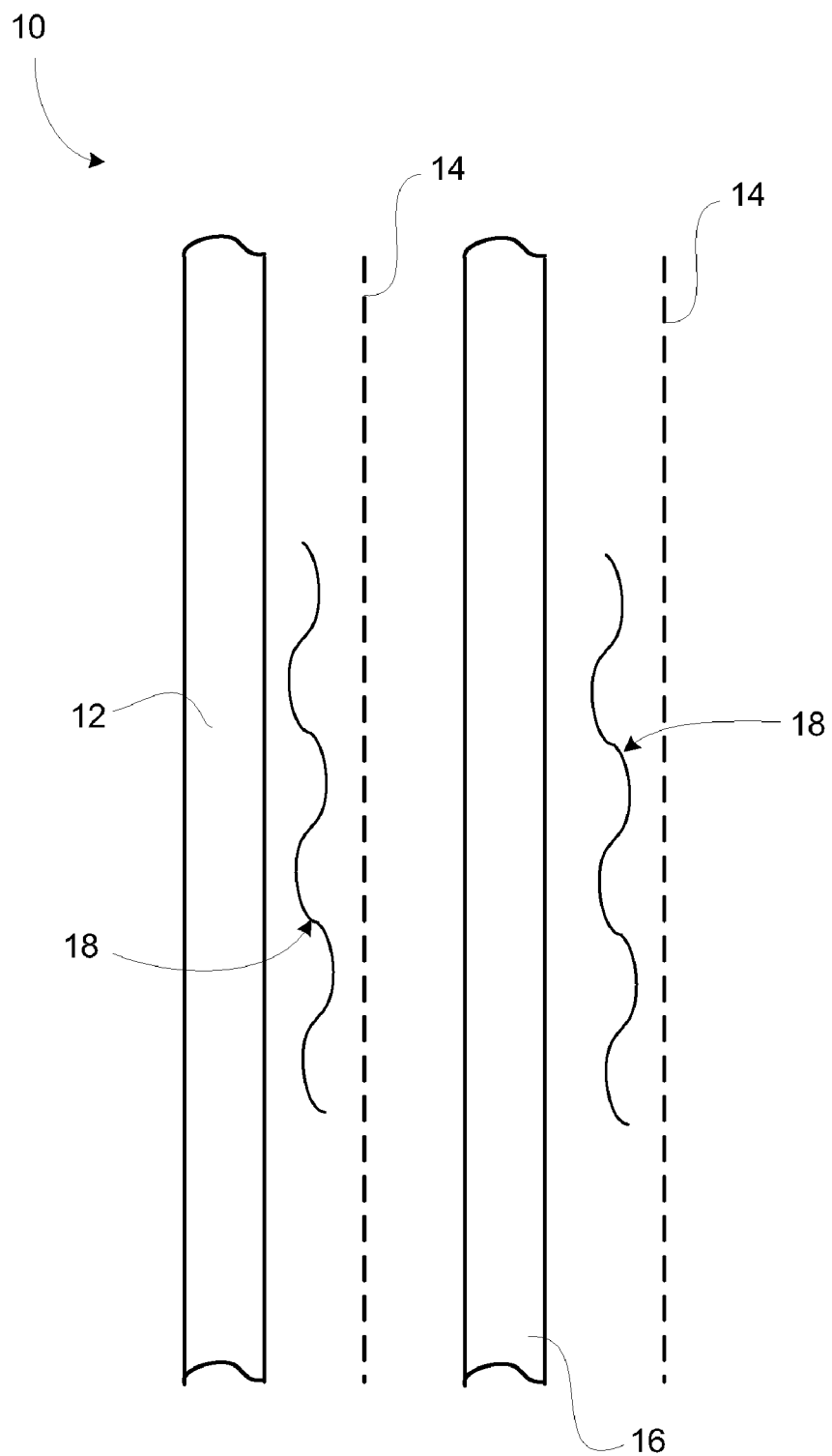
FIG. 1 is an illustration of one advantageous embodiment of the present invention showing an exploded cross-section of a thermal board.

Referring now to the drawings, wherein like reference numerals designate corresponding structure throughout the views.

Referring now to FIG. 1, an exploded cross-section of the thermal board 10 is provided. First layer 12 may be provided as a sheet of gypsum board or drywall having, for example, a ¼ inch thickness. It should be noted, however, that the first layer is not limited to ¼ inch thickness, but may be selected having virtually any thickness. The thickness of the drywall can be selected depending on the application (e.g., residential, commercial or industrial environment).

Also illustrated in FIG. 1 is thermally reflective layer 14, which may be provided as a spray coating or as a metallic foil to provide for reflection of IR radiation.

The thermally reflective layer 14 may be affixed or applied to each side of a second layer 16, which may comprise a dense-fiber board. This thermally reflective layer 14 may, in one advantageous embodiment, comprise a thermally reflective spray having an emissivity value of less than 0.25 (e.g., e–0.25). The thermally reflective spray may comprise, for example, a ceramic-aluminum composite comprising a barrier coat where the aluminum is provided in the spray in the form of thin aluminum flakes that are highly reflective and reduce the penetration of Infrared Radiation (IR). The overlapping aluminum flakes align and are concentrated near the surface and may have a reflectance value of 0.75 to 0.8 for the spectral range of 1 mu.m to 8 mu.m. The thermal coating acts to reflect radiation away from the surface to which it is applied acting like a mirror to IR.

In an alternative embodiment, a thin sheet of thermally reflective material may be used in place of the spray coating. The thermally reflective layer 14 may be very thin relative to the first layer 12 and the second layer 16 such that its thickness in measuring the overall thickness of the bonded thermal board 10 may be ignored. Like the spray coating, the thin sheet may, in one advantageous embodiment, be bonded to each side of the second layer 16.

Also illustrated in FIG. 1 is second layer 16. The second layer 16 is provided as a material (e.g., dense-fiber board) having good thermal properties. For example, it is contemplated that DensGlass™ as manufactured by Georgia-Pacific may be used. For example, the dense-fiber board may be provided having a permeance (ASTM E96): not more than 23 perms and an R-Value (ASTM C518): 0.56. Alternatively, the dense-fiber board may be provided as a fire-rated material having a permeance (ASTM E96): not more than 12 perms and an R-Value (ASTM C518): 0.67.

Finally, a bonding adhesive 18 is illustrated in FIG. 1 for bonding the first layer 12 (drywall) and second layer 16 (dense-fiber board) into a single unitary structure. In the event a metallic foil is used as the thermally reflective layer 14 on both sides of the dense-fiber board, then the bonding adhesive 18 would be applied between the thermally reflective layers 14 and the second layer 16. If, however, the thermally reflective layer 14 is provided as a spray coating, then the bonding adhesive 18 need only be used to bond the first and second layers 12,16 together.

It is contemplated that, once assembled, the thermal board 10 may be provided in standard sizes as commonly used for drywall, including, for example, sheets measuring 4 feet in width×8 feet in length and having a thickness determined by the selected thicknesses of the first and second layers (e.g., bonded structure may be, for example, ¼", ½", ⅝", ¾", etc.). Additionally, as the thermal board 10 is provided as a single unitary structure, it can be cut and installed in the same manner as conventional drywall providing an easy to install and cost effective construction product that will provide a better thermal barrier and reduced operating costs to individuals and companies.

Figure 2:
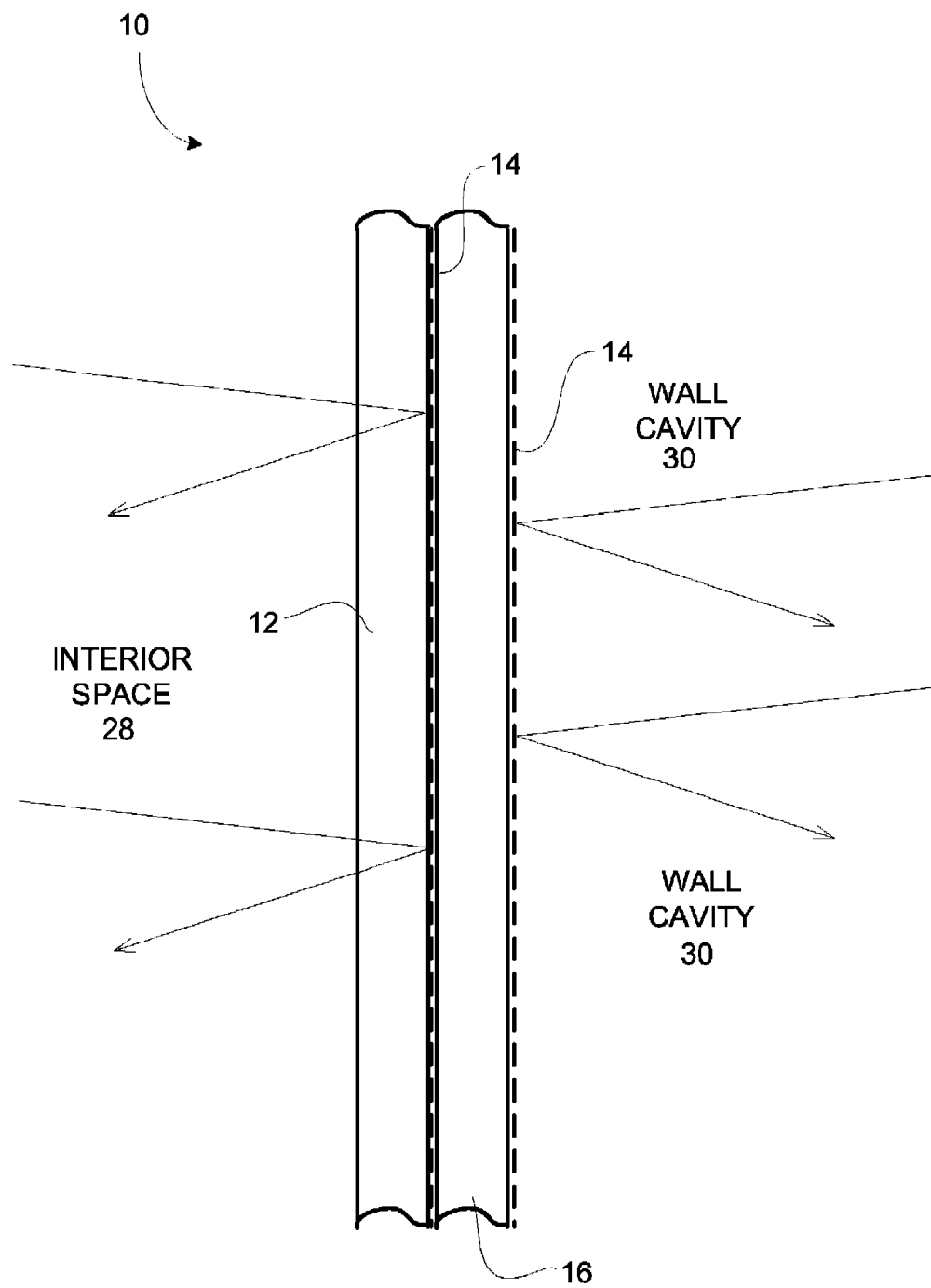
FIG. 2 is an illustration of the embodiment according to FIG. 1 illustrating thermal reflection.

FIG. 2 is illustrates the bonded layers of the thermal board 10 according to FIG. 1. Arrows are shown in the drawing that illustrating how thermal radiation interacts with the thermal board 10. For example, any temperature differential between the interior space 28 and the wall cavity 30 is maintained by the barrier created by the combination of the reflective layer 14 and second layer 16. This effectively minimizes and/or prevents thermal migration within the wall cavity 30.

Figure 3:
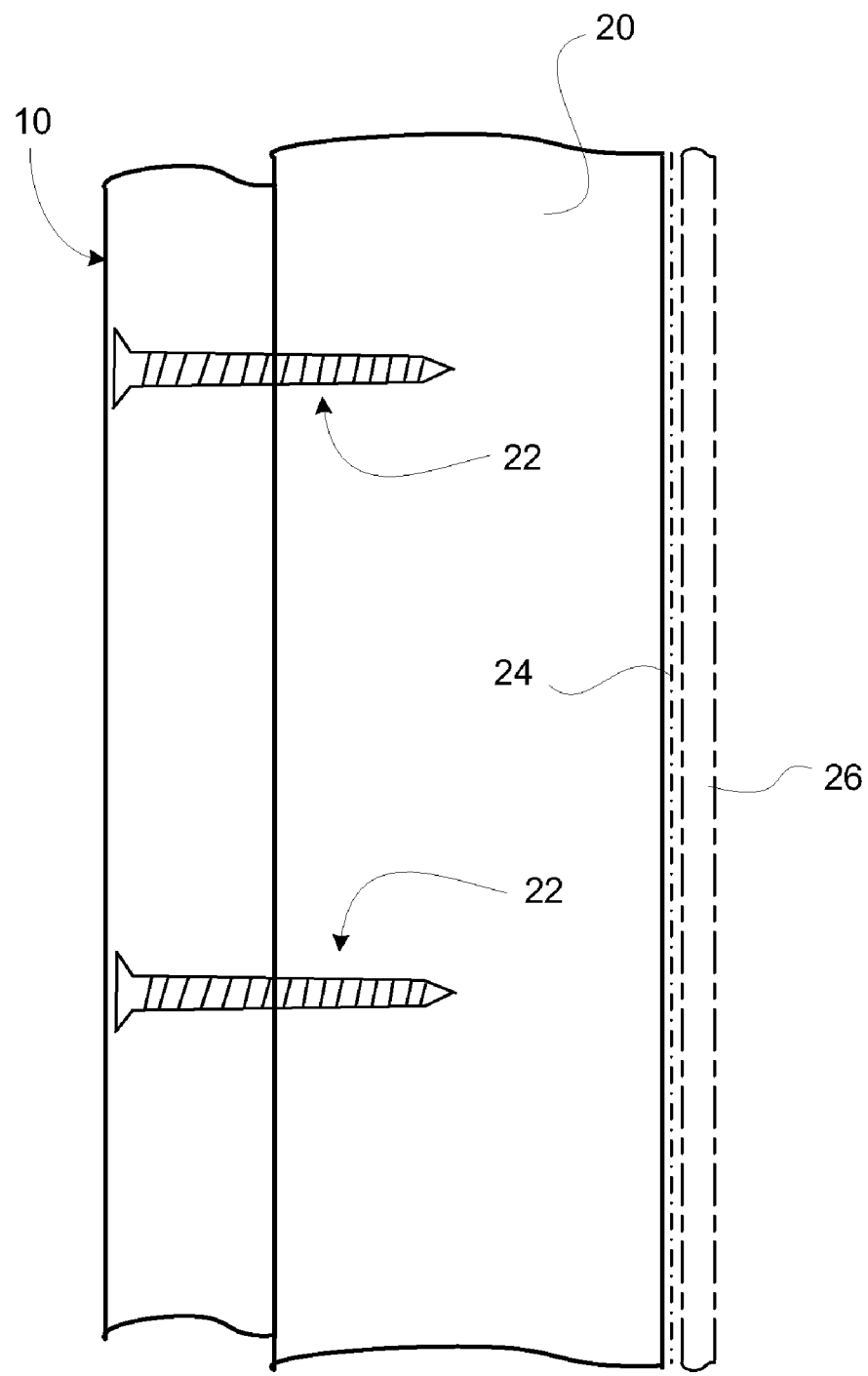
FIG. 3 is an illustration of the embodiment according to FIG. 1 showing the thermal board affixed to a support structure.

FIG. 3 illustrates one means of affixing (via mounting device 22) the thermal board to a support structure 20, which may comprise, for example, a wall stud or ceiling joist. In this embodiment, the mounting devices 22 comprise standard drywall screws, but could include any acceptable method for affixing the thermal board to the support structure, including for example, use of nails, screws, clips, adhesive, etc.

In the illustration shown in FIG. 3, the support structure comprises a wall stud and further includes a vapor barrier 24 and sheathing 26 affixed to the exterior surface of support structure 20. It is contemplated that the vapor barrier 24 may comprise and commercially available sheet of material, such as, for example, tar paper or Tyvek®. Additionally, the exterior sheathing 26 may comprise virtually any type of material, such as, for example but not limited to, cedar clapboard siding, plastic/vinyl siding, shingles, stucco, stone (and stone veneer), brick (and brick veneer), cement fiber, composite materials, steel, aluminum, etc.

Figure 4:
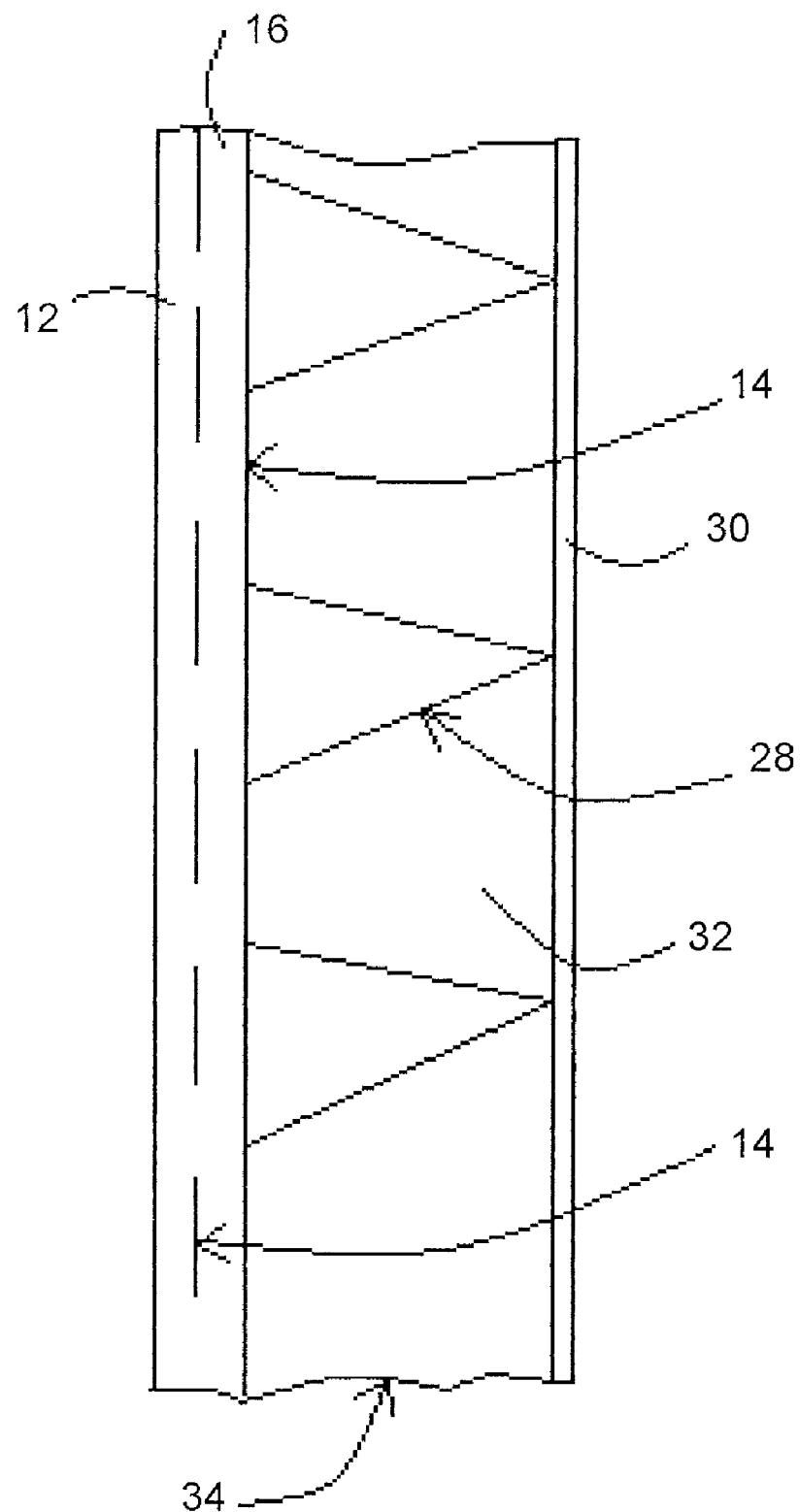
FIG. 4 is an illustration of an advantageous embodiment of the present invention.

FIG. 4, is an illustration of another advantageous embodiment including the first layer 12 that may be provided as a sheet of gypsum board or drywall having. In one embodiment, a second layer 16 is provided as a material (e.g., dense-fiber board) that is adhered to the first layer. Also provided in FIG. 4 is a corrugation or spacing device 28 and a sheet of paper material 30, e.g. a heavy paper backing, such that a cavity 32 is formed between the first layer 12 and the paper material 30. Also shown in FIG. 4 is a thermal foam or insulation 34 (e.g., a product having good thermal characteristics) may be injected or inserted into the cavity 32. It is contemplated that the injected insulation 34 may be provided as liquid that will set up or harden so as to create a single composite thermal board 10.

In still another embodiment, a thin sheet of thermally reflective layer or spray 14 may be applied to one side of the first layer. In still another embodiment, a second thermally reflective layer 14 may be applied to one side of the second layer 16.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for providing a composite thermal barrier wall board for interior cladding of an underlying support structure comprising the steps of:
   providing a first layer comprising gypsum board positioned toward an interior space in a structure;
   providing a second layer comprising paper;
   positioning a first thermally reflective layer between the first and second layers;
   positioning a second thermally reflective layer toward an exterior of the structure relative to the second layer;
   forming a cavity between the first and second layers by positioning a spacing device between the first and second layers;
   inserting injecting an insulating material within into the cavity in a liquid form, the insulating material subsequently hardening;
   bonding and compressing the first and second layers and the first and second thermally reflective layers together as a single unitary wall board structure forming an interior surface when affixed to the surface of the underlying support structure.

2. The method of claim 1 wherein the first thermally reflective layer is selected from the group consisting of: a spray coating, a metallic foil and combinations thereof.

3. The method of claim 2 wherein the spray coating is a ceramic-aluminum composite where aluminum is provided in the spray in the form of aluminum flakes such that the spray coating has a reflectance value of at least 0.75 for the spectral range of 1 mu.m to 8 mu.m.

4. The method of claim 1 further comprising the step of positioning a third layer between the first layer and the spacing device.

5. The method of claim 4 further comprising the step of positioning a second thermally reflective layer positioned on a surface of the third layer.

6. The method of claim 4 wherein said third layer comprises a dense-fiber board.

7. A method of constructing a composite thermal barrier wall board for interior cladding of an underlying support structure comprising the steps of:
   providing a first layer comprising gypsum board positioned toward an interior space in a structure;

providing a second layer comprising paper;

positioning a first thermally reflective layer between the first and second layers;

positioning a second thermally reflective layer toward an exterior of the structure relative to the second layer;

forming a cavity between the first and second layers by positioning a spacing device between the first and second layers;

injecting an insulating material into the cavity in a liquid form;

bonding and compressing the first layer, the second layer, the first thermally reflective layer, the second thermally reflective layer, and the spacing device together using an adhesive to form a single composite unitary wall board structure and forming an interior surface when affixed to the surface of the underlying support structure.

8. The composite thermal barrier wall board of claim 7 wherein subsequent to injecting the insulating material into the cavity said insulating material hardens such that the first layer, second layer, first thermally reflective layer, second thermally reflective layer, and the insulating material form a single composite unitary structure.

9. A composite thermal barrier wall board for interior cladding of an underlying support structure comprising:
- a first layer comprising gypsum board to be positioned toward an interior space in a structure;
- a second layer comprising paper;
- a spacing device positioned between the first and second layers forming a cavity between the first and the second layers;
- a first thermally reflective layer positioned between the first and second layers;
- an insulating material positioned within the cavity;
- wherein said first and second layers, said spacing device, said insulating material and said first thermally reflective layer are bonded and compressed together as a single unitary wall board structure forming an interior surface when affixed to the surface of the underlying support structure.

10. The composite thermal barrier wall board structure of claim 9 wherein said insulating material is injected into the cavity.

11. The composite thermal barrier wall board structure of claim 9 further comprising a third layer positioned between the first layer and the spacing device.

12. The composite thermal barrier wall board structure of claim 11 further comprising a second thermally reflective layer positioned on a surface of the third layer.

13. The composite thermal barrier wall board structure of claim 11 wherein said third layer comprises a dense-fiber board.

14. The composite thermal barrier wall board structure of claim 9 wherein the first thermally reflective layer is selected from the group consisting of: a spray coating, a metallic foil and combinations thereof.

15. The composite thermal barrier wall board structure of claim 14 wherein the first thermally reflective layer has an emissivity value of less than 0.25 (e-0.25).

16. The composite thermal barrier wall board structure of claim 14 wherein when the first thermally reflective layer comprises a spray coating, the spray coating comprises a ceramic-aluminum composite where the aluminum is provided in the spray in the form of aluminum flakes.

17. The composite thermal barrier wall board structure of claim 16 wherein the spray coating has a reflectance value of at least 0.75 for the spectral range of 1 mu.m to 8 mu.m.

18. The composite thermal barrier wall board structure of claim 9 wherein the composite thermal barrier structure is provided as a 4 foot by 8 foot sheet of material.

19. The composite thermal barrier wall board structure of claim 9 further comprising mounting devices selected from the group consisting of: nails, screws, clips, adhesive and combinations thereof.

* * * * *